(12) United States Patent
Bitar et al.

(10) Patent No.: US 9,728,090 B2
(45) Date of Patent: Aug. 8, 2017

(54) SYSTEM FOR MANAGING THE TERMINAL PART OF A FLIGHT PLAN

(75) Inventors: Elias Bitar, Tournefeuille (FR); Stephane Leriche, Colomiers (FR); Christophe Caillaud, Blagnac (FR)

(73) Assignee: THALES, Neuilly/sur/Seine (FR)

( * ) Notice: Subject to any disclaimer, the term of this patent is extended or adjusted under 35 U.S.C. 154(b) by 1506 days.

(21) Appl. No.: 12/096,548

(22) PCT Filed: Nov. 14, 2006

(86) PCT No.: PCT/EP2006/068456
§ 371 (c)(1),
(2), (4) Date: Jun. 6, 2008

(87) PCT Pub. No.: WO2007/065775
PCT Pub. Date: Jun. 14, 2007

(65) Prior Publication Data
US 2008/0294335 A1   Nov. 27, 2008

(30) Foreign Application Priority Data
Dec. 7, 2005  (FR) .................................... 05 12418

(51) Int. Cl.
*G08G 5/00* (2006.01)
*G01C 21/14* (2006.01)
*G05D 1/06* (2006.01)

(52) U.S. Cl.
CPC ........... *G08G 5/0039* (2013.01); *G01C 21/14* (2013.01); *G05D 1/0676* (2013.01)

(58) Field of Classification Search
CPC .................................................... G05D 1/0676
See application file for complete search history.

(56) References Cited

U.S. PATENT DOCUMENTS

| 4,642,775 A * | 2/1987 | Cline | G01C 23/00 701/528 |
| 6,334,344 B1 * | 1/2002 | Bonhoure | G05D 1/101 244/190 |

(Continued)

FOREIGN PATENT DOCUMENTS

| FR | 2854948 | * 11/2004 |
| WO | 2004085964 | 10/2004 |

*Primary Examiner* — Neal Sereboff
(74) *Attorney, Agent, or Firm* — Hauptman Ham, LLP; Sean A. Passino

(57) ABSTRACT

The management system plots the route to be flown in a flight plan, at least partially, by a chaining of published navigation procedures accessible from a NavDB navigation database and constituted of sequences of waypoints and/or turn points associated with specific flight constraints. It comprises a mirror memory storing the latest versions of the published navigation procedures, modified by the crew of the aircraft during the progress of the flight plan and means of substituting these latest versions stored in the mirror memory for the published versions of the navigation procedures during a change in the route predicted in the flight plan obtained by a new chaining of navigation procedures, some of which are taken from the preceding chaining. This makes it possible, during a change of navigation procedure, to take account of specific flight constraints already entered during the progress of the flight but not appearing in the published navigation procedures.

6 Claims, 2 Drawing Sheets

(56) References Cited

U.S. PATENT DOCUMENTS

| | | | |
|---|---|---|---|
| 6,349,258 B1* | 2/2002 | Bonhoure | G05D 1/0202 244/175 |
| 6,405,107 B1* | 6/2002 | Derman | G01C 21/005 340/3.5 |
| 6,707,475 B1 | 3/2004 | Snyder | |
| 6,922,703 B1 | 7/2005 | Snyder et al. | |
| 7,194,353 B1* | 3/2007 | Baldwin | G01C 21/00 701/301 |
| 7,702,427 B1* | 4/2010 | Sridhar | G08G 5/045 701/14 |
| 2005/0075921 A1* | 4/2005 | Hayes-Roth | G06Q 10/06 705/7.26 |
| 2006/0064242 A1* | 3/2006 | Litvack | G01C 21/203 701/410 |
| 2006/0146048 A1* | 7/2006 | Wright | G01C 23/00 345/419 |
| 2007/0050098 A1* | 3/2007 | Caillaud | G01C 23/00 701/3 |
| 2007/0225876 A1* | 9/2007 | Caillaud | G08G 5/0013 701/16 |

\* cited by examiner

SYSTEM FOR MANAGING THE TERMINAL PART OF A FLIGHT PLAN

CROSS-REFERENCE TO RELATED APPLICATIONS

The present application is based on International Application No. PCT/EP2006/068456, filed on Nov. 14, 2006, which in turn corresponds to French Application No. 0512418 filed on Dec. 11, 2006, and priority is hereby claimed under 35 USC §119 based on these applications. Each of these applications are hereby incorporated by reference in their entirety into the present application.

FIELD OF THE INVENTION

The present invention relates to the following of a flight plan taking account of navigation instructions and procedures imposed by the air traffic control authorities.

BACKGROUND OF THE INVENTION

A flight plan defines the route which the crew of an aircraft foresees following in order to go from its departure point to the destination point of its mission as well as the conditions for flying this route by a succession of waypoints or turn points, connected by straight or curved segments called "legs" and associated with various flight constraints of heading, altitude, speed, passage time, etc., that have to be complied with by the aircraft when it passes above them or in their vicinity. This succession of waypoints is entered into the on-board equipment of an aircraft by means of a programming interface with a keyboard and screen called an MCD or MCDU (an acronym for "Multipurpose Control and Display Unit") and is displayed on the screens on board during the progress of the flight plan, either in graphical form, the next waypoints to come and the legs which connect them appearing superimposed on a PFD (the acronym for Primary Flight Display) primary piloting screen or on the scrolling map of a navigation screen, or in the form of a scrolling alphanumeric table listing the waypoints to come, in their order of succession on the predicted route of the flight plan with the constraints associated with each one of them, or, most often, in both the graphical and the alphanumeric forms. The chaining, by the pilot in manual piloting or by a flight management computer in automatic piloting, of the succession of waypoints predicted in the flight plan and the compliance with the specific flight constraints associated with the waypoints determine the real routing of the aircraft.

In geographic zones with dense air traffic and in the vicinity of airports, air traffic is subjected to regulations called navigation procedures, which are the subject of regular publications, and to regulation by air traffic control authorities whose instructions received during the progress of the flight take precedence over the published navigation procedures.

The published navigation procedures consist of series of "waypoints" corresponding to traffic corridors, associated with specific flight constraints. Different categories are distinguished, the principal ones of which are as follows:
- navigation procedures known as SID (the acronym for "Standard Instrument Departure") which define the paths authorized on takeoff in the proximity of an airport,
- so-called "Airway" navigation procedures which define the air routes over a territory,
- navigation procedure known as STAR (the acronym for "Standard Terminal Arrival Route") which define the authorized paths when arriving at an airport,
- approach procedures which define the authorized paths to the terrain of the airport (generally a landing runway).

These navigation procedures are imposed for the terminal parts (departure, arrival and approach) of most flight plans and it is not rare for the terminal part of the predicted route in the flight plan to result from the chaining of several published navigation procedures.

During the progress of a flight, the pilot of an aircraft can be led to modify his flight plan and to change the published navigation procedure in order to comply with an instruction from an air traffic control authority. This is the case, for example, when he receives a change of landing runway instruction on approaching the destination airport. The case can arise on approaching certain large airports with parallel runways, such as Los Angeles, Atlanta, Paris CDG, London Heathrow, etc., for various reasons such as for example in order to reduce taxiing time.

For parallel runways, the approach procedures can correspond to paths that are close or even partially superimposed. At Los Angeles, the approach procedures have "waypoints" with different names whilst this is not the case for certain approach procedures at Heathrow.

When an air traffic control authority asks an aircraft to change its landing runway, the pilot will search in a navigation database for the published navigation procedure or procedures appropriate for the approach to the new runway in order to substitute them for those that are no longer suitable and initially appearing in the flight plan programmed in the on-board equipment of the aircraft.

This operation can have undesirable effects insofar as it provokes a reiteration of the operation of chaining published navigation procedures over the terminal part of the route predicted in the flight plan. Indeed, it is possible that the new navigation procedures adopted partially reuse published navigation procedures adopted in the initial flight plan but having been modified by the pilot during the progress of the flight in order to comply with one or more instructions from an air traffic control authority. Given the sharing of airspace in zones of competence, these modifications diverging from the published regulations can be unknown to the air traffic control authority asking for the change of landing runway and which therefore has no reason to recall them. Not being reiterated to the crew of the aircraft, there is a risk that they are not taken into account when there is a change of approach procedure. Thus, an altitude constraint, imposed by an air traffic control authority on passing a "waypoint" forming part of the initial approach procedure not recalled by the control authority asking for the change of landing runway whereas the "waypoint" is still part of the new approach procedure, runs a certain risk of not being complied with out informing the crew.

These problems exist with no matter what change of terminal procedure (departure, arrival, approach) as soon as any modification whatsoever has been made (constraint, adding of intermediate waypoints) and which applies to a portion common to the old procedure and to the new procedure.

In order to deal with this, it is known to retain the inactivated old navigation procedure or procedures in the alphanumeric table for displaying the route of a flight plan. This technique is little appreciated because it amounts to causing the same waypoints to appear several times in an alphanumeric table of the flight plan, or even to cause whole sequences of waypoints which will not be flown to appear in this table and to oblige the crew to differentiate between the active and inactive waypoints when it is monitoring the correct progress of the flight plan, which increases its workload during difficult phases such as an approach flight phase.

SUMMARY OF THE INVENTION

An objective of the present invention is to solve this problem.

The invention is directed to a system for managing a flight plan for an aircraft predicting a defined route, at least partially, by a chaining of published navigation procedures accessible from a navigation database and constituted of sequences of waypoints and/or turn points associated with specific flight constraints, comprising a mirror memory storing the latest versions of the published navigation procedures, modified by the crew of the aircraft during the progress of the flight plan and means for substituting these latest versions stored in the mirror memory for the published versions of the navigation procedures during a change in the route predicted in the flight plan obtained by a new chaining of navigation procedures, some of which are taken from the preceding chaining.

Advantageously, the mirror memory of the management system stores a modified version of a published navigation procedure each time that it is validated and incorporated by the crew into the route predicted in the flight plan.

Advantageously, the management system comprises filtering means selecting, according to operational criteria, among the modifications in a navigation procedure made by the crew of the aircraft, the modifications used in the modified version of the procedure stored in the mirror memory.

Advantageously, the system offers the crew of the aircraft the choice of the published procedure in order to return to it if the operational context justifies it.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF PREFERRED EMBODIMENT

Figure 1:
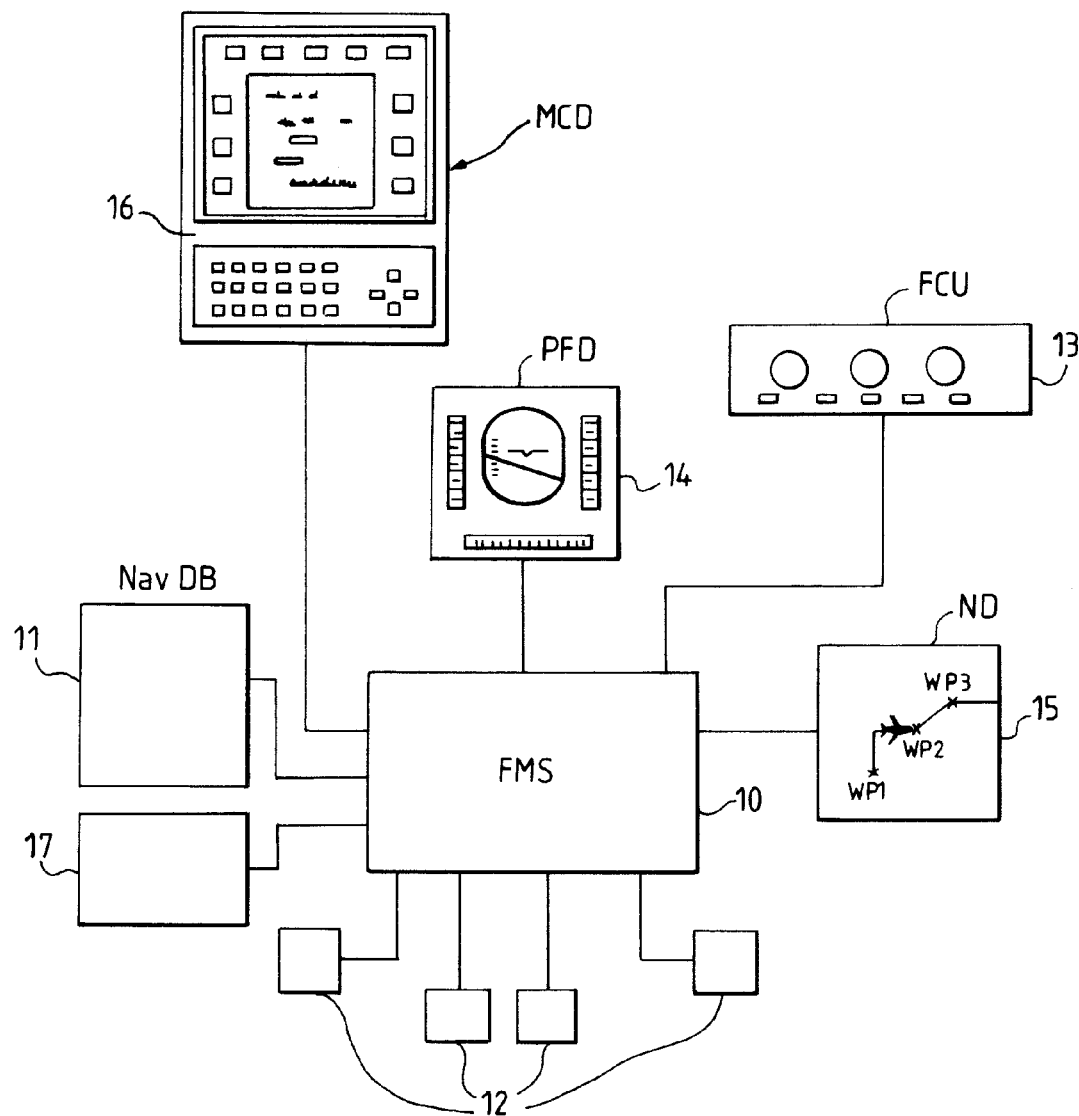
FIG. 1 shows the configuration of a flight management system for an aircraft making it possible to implement the invention.

As shown in FIG. 1, an on-board flight management system comprises an FMS flight management computer 10.

The latter exchanges various data with a navigation database 11 called NavDB (the acronym for "Navigation Database"), with a mirror memory 17 and with other items of equipment 12 of the aircraft. It communicates with the crew of the aircraft by the intermediary of man-machine interfaces among which are principally found:

an FCU control panel 13 with switches, knobs, display devices and indicator lamps allowing the selection and parameterization of the principal operating modes of the FMS computer 10 and of the automatic pilot and/or flight manager upon which the FMS computer 10 acts but which is not shown in order not to uselessly clutter FIG. 1, a PFD primary piloting screen 14 used for displaying an artificial horizon and flight parameters such as the altitude of the aircraft, its attitude, its speed vector, a guidance mode indication, etc., an ND navigation screen 15 for displaying maps, the flight plan, etc., an MCD console for displaying and entering data 16 having a keyboard and a screen (possibly surrounded by function keys), and constituting the principal instrument of dialog with the FMS computer 10.

The FMS computer 10 assists the crew of an aircraft in the definition of the flight plan before takeoff and whilst following the flight plan after takeoff and until the landing. Its assistance in the definition of the flight plan consists in simplifying, for the crew, the plotting, in the horizontal and vertical planes, the route that the aircraft will have to follow in order to complete its mission by reducing, for the crew, this plotting operation to just defining a path outline formed from a succession of waypoints or turn points associated with various flight constraints such as altitude, speed, time, heading or others. During the preparation of the flight plan, the crew enters into the FMS computer 10, by means of the MCD console 16, in an explicit or implicit manner, the geographical coordinates of the waypoints and the flight constraints that are associated with them, and obtains from the FMS computer 10 a flight plan constructed from a chaining of straight or curved segments or "legs" connecting in pairs the waypoints marking out the route of the aircraft from the point of departure to the point of destination and ensuring the changes of heading and compliance with the specific flight constraints encountered at the waypoints. In order to allow monitoring, by the crew of the aircraft, of the following of the route predicted in the flight plan, the waypoints belonging to the route which remains to be flown are displayed, in graphical form, with the legs which join them, on the ND navigation screen 15 and, in alphanumeric table form, with their individual flight constraints, on a display screen of the MCD console 16.

The NavDB navigation database 11, which is on board or accessible from the FMS computer 10, stores the published navigation procedures which the aircraft can be made to comply with in its normal operating space, in a set of individual files 110 containing their names as well as their sequences of waypoints and the specific flight constraints associated with them.

The MCD console 16 allows the crew to enter the plotting data of the route of a flight plan into the FMS computer 10, either at the elementary level of the waypoints with their associated flight constraints, or at the intermediate level of navigation procedures which make it possible to enter into the FMS computer 10 sequences of plotting data applicable to portions of the flight plan subjected to published regulations.

When the crew wishes to enter a published navigation procedure in the predicted flight plan, it activates, by operating the appropriate knob or knobs of the MCD console 16, a navigation procedure input program. This program asks to be informed of the identity of the published navigation procedure in order to be able to search for it in the NavDB navigation database 11 and of the geographic position from which the navigation procedure must be implemented in order to be able to propose a rejoining path. This position can be that of a waypoint or the current position of the aircraft. Once in possession of these items of information, it proposes, laterally and vertically, a path for rejoining the route defined by the published navigation procedure from the given position as an instruction for the use of the navigation procedure. The rejoining path proposed by the flight management computer 10 is the shortest one in order to arrive at the destination point of the published procedure taking account of the flight constraints associated with the waypoints of the published navigation procedure, a waypoint with an obligation to pass through it not being ignored, and a limit being fixed to the forces undergone by the structure of the aircraft and to the discomfort of the passengers caused by the maneuvers necessary for the rejoining maneuver.

Figure 2:
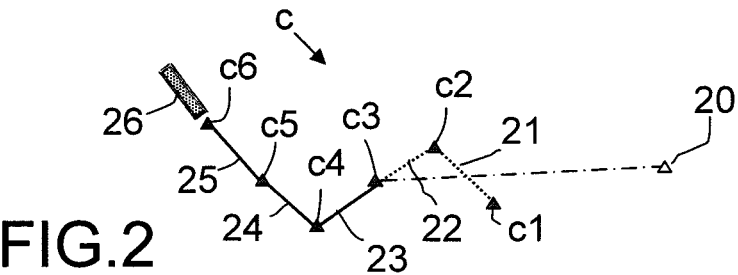
FIGS. 2 to 5 show an example of a lateral plot of a route predicted in a flight plan undergoing successive modifications during the progress of the flight plan in order to meet the demands of an air traffic control authority.

FIG. 2 shows an example of a lateral plot of a terminal route of a flight plan in the case of an aircraft having received from an air traffic control authority an instruction to change landing runway, whilst it was following the published approach procedure of its destination airport initially predicted in its flight plan. In response to the change of landing runway instruction received from the air traffic control authority, the pilot has programmed in his flight management computer, the following, from his current position 20, of the published approach procedure c of the newly allocated landing runway 26, which corresponds to the sequence of waypoints c1 to c6 connected in pairs by the legs 21 to 25. As the aircraft is not in the normal cone of access to the entrance leg 21 of the published approach procedure c of the newly allocated landing runway, the pilot asks the flight management computer for a modification of the published approach procedure c which consists of rejoining his route only at its third waypoint c3 and of shedding the first two waypoints c1 and c2.

This modification of the published approach procedure is shown up in FIG. 2 by a representation in dotted and dashed line of the rejoining path, in dotted line of the first two legs 21, 22 not flown and in continuous line of the last three legs 23, 24, 25 flown and ending at the runway 26. Once validated by the pilot and therefore integrated into the flight plan programmed in the flight management computer, the modified approach procedure is stored in the mirror memory 17 as a complete new approach procedure. It can be stored as it is or after a filtering eliminating certain modifications which it incorporates, such as for example the modifications of the horizontal profile because a modified version of an approach procedure must retain, during its chaining, a certain integrity with respect to the published version.

More generally, during each loading, in the predicted flight plan, of a published navigation procedure belonging to the NavDB navigation database 11, a copy of it is retained, over the duration of the aircraft's mission, in the mirror memory 17 in order to reflect the possible modifications concerning it made to the flight plan or, among these, only some of them selected according to operational criteria. Thus, when the context of the flight imposes the reassessment of the chaining, in the route predicted in the flight plan, of a navigation procedure, it is possible to find it again in the mirror memory 17 with the modifications having exceeded the selection operational criteria, if the new construction does not make it totally null and void.

Each time that a portion of navigation procedure is added, removed or modified in the route predicted in the flight plan, a new modified version of the navigation procedure reflecting all of the additions, deletions or modifications, or only those having satisfied selection criteria, is stored in the mirror memory 17. During a possible chaining of navigation procedures in the flight plan, it is their versions stored in the mirror memory 17, when they exist, which will be used by the flight management computer in order to plot the route of the aircraft unless the crew decides to return, for one or more navigation procedures, to the reference published versions stored in the NavDB navigation database 11. Means are provided in the flight management computer to give the crew of the aircraft the possibility of choosing between the modified versions of a navigation procedure stored in the mirror memory (17) and the published version of that navigation procedure stored in the navigation database (11).

Figure 3:
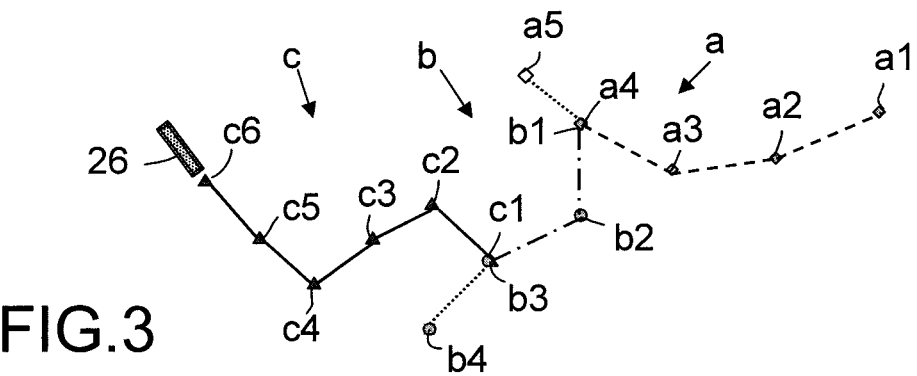
Figure 4:
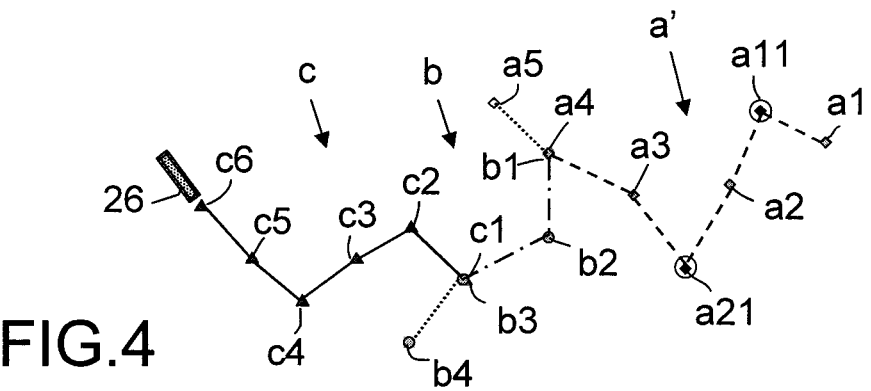
Figure 5:
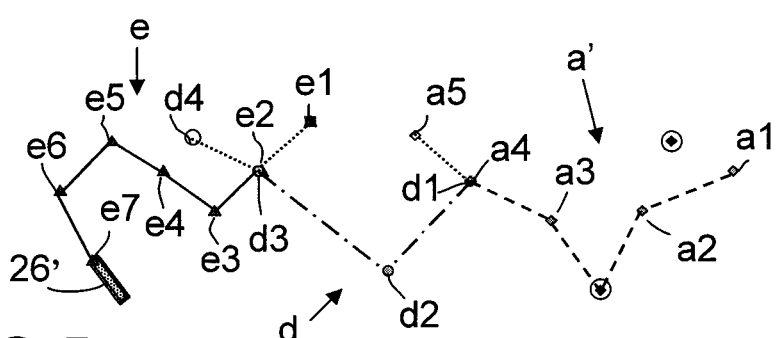

FIGS. 3, 4 and 5 give an example of the evolution of the route predicted in a flight plan during the execution of a mission.

FIG. 3 shows the waypoints and legs of the terminal route predicted in the flight plan before the start of the mission. This terminal route is generated from the chaining of three published navigation procedures a, b and c taken from the NavDB navigation database 11. The published navigation procedure relates to a first air route between two waypoints a1 and a5 marked out by three intermediate waypoints a2, a3 and a4. The published navigation procedure b relates to a second air route between two waypoints b1 and b4, marked out by two intermediate waypoints b2 and b3, the waypoint b1 also being the waypoint a4 of the first air route. The published navigation procedure c is the approach procedure of a landing terrain illustrated in FIG. 2. It defines a third air route between two waypoints c1 and c6, of which c6 is placed at the entrance of the landing runway 26, marked out by four intermediate waypoints c2 to c4, the waypoint c1 also being the waypoint b3 of the second air route. Once programmed, the flight management computer of the aircraft carries out the chaining of the three navigation procedures a, b and c in order to make the aircraft arrive at the landing runway 26 by passing through the three air routes defined in the published navigation procedures a, b and c, and by taking the shortest possible path between the waypoint a1 and the waypoint c6 at the entrance of the runway 26. This results in it proposing a path shedding the last waypoints a5 and b4 of the first two published navigation procedures a and b since the penultimate waypoints a4 and b3 of these published navigation procedures belong to the following published navigation procedure. The path proposed as a predicted route in the flight plan appears in dashed, dashed and dotted and continuous lines in FIG. 3 whilst the two discarded waypoints a5 and b4 and the non-flown legs leading to them are shown in dotted line.

FIG. 4 shows a first modification of the terminal route initially predicted in the flight plan shown in FIG. 3. This modification, made by the pilot during the progress of the flight whilst the aircraft has not yet arrived at the first air route defined by the first published navigation procedure, consists in elongating the path of the aircraft in order to satisfy a request to delay the arrival of the aircraft at the destination airport expressed by an air traffic control authority. This elongation is made in the first air route defined by the first published navigation procedure a by adding to that route two intermediate waypoints a11 and a21 offset on either side. This results in a modified version a' of the first navigation procedure defined by the sequence of waypoints a1, a11, a2, a21, a3, a4 and a5 which is stored in the mirror memory 17.

FIG. 5 shows a second modification of the terminal route initially predicted in the flight plan shown in FIG. 3. This modification is made by the pilot during the progress of the flight whilst the aircraft has not yet arrived at the first air route defined by the first modified navigation procedure a'. It consists, in order to satisfy a request to change the landing runway expressed by an air traffic control authority after a delay request expressed by the same air traffic control authority or by another one, in replacing the second and third published navigation procedures b and c by two new published navigation procedures d and e adapted to the approach to the new landing runway 26' and defined by two new sequences of waypoints d1 to d4 and e1 to e7. The flight management computer then takes up the chaining of navigation procedures on the basis of the modified version a' of the first navigation procedure stored in the mirror database 17 and of the new published navigation procedures d and e stored in the NavDB navigation database 11, thus retaining the first modification made previously by the pilot. The pilot can of course, at any time, oblige the flight management computer to take up the chaining with the published version a of the first navigation procedure and delete the two additional waypoints a11 and a21 added for the purpose of extending the path in order to delay the arrival of the aircraft at its destination.

A same navigation procedure can undergo several successive modifications during a flight and because of this can have several modified versions stored in the mirror memory 17.

When there is a possibility of storing several modified versions of a navigation procedure in the mirror memory 17, a version selection mechanism is provided for use by the pilot, for example by means of a selection pointer operating on a graphical display of the path of the route predicted in the flight plan or by means of a programmed selection key on the MCD console 16.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of managing a flight plan of an aircraft executed by a flight management system (FMS), the fight plan defining a predicted terminal route to be followed by the aircraft and being defined by chaining one or more navigation procedures, each navigation procedure comprising a sequence of various waypoints associated with specific flight constraints, and the last chained navigation procedure being an approach procedure of a predetermined landing terrain, said method comprising:

before a start of a flight and during a progress of the flight whilst the aircraft has not yet arrived at the predicted terminal route, upon a first request of a crew, loading in the flight plan a published navigation procedure accessible from a navigation database and storing automatically said published navigation procedure in a dedicated memory;

during the progress of the flight whilst the aircraft has not yet arrived at the predicted terminal route, upon a second request of the crew, modifying the published navigation procedure stored in the dedicated memory and storing automatically in the dedicated memory said modified published navigation procedure as a new modified version of the published navigation procedure; and during the progress of the flight whilst the aircraft has not yet arrived at the predicted terminal route and upon a third request of the crew, generating an updated modified flight plan by:

selecting, by the FMS, a set of navigation procedures among the navigation procedures stored in the dedicated memory, chaining, by the FMS, the selected navigation procedures with said modified published navigation procedure to define an updated modified terminal route to be followed by the aircraft, displaying for the crew, on a navigation screen of the FMS, the updated modified terminal route predicted in the updated modified flight plan, and causing the FMS to execute the updated modified flight plan based on the updated modified terminal route.

2. The method as claimed in claim 1, further comprising selecting, according to operational criteria, among modifications in a navigation procedure made by the crew of the aircraft, the modifications used in the modified versions of the initial published navigation procedure stored in the dedicated memory.

3. The method as claimed in claim 1, wherein modifying the published navigation procedure comprises adding waypoints or/and removing waypoints.

4. The method as claimed in claim 1, further comprising selecting, by the FMS, one or more navigation procedures stored in the dedicated memory and displaying, on the navigation screen of the FMS, the selected navigation procedure(s).

5. The method as claimed in claim 1, wherein the modified published navigation procedure is one modification of a plurality of modifications of the published navigation procedure, the method further comprising presenting a selection pointer on the navigation screen for selecting among the plurality of modifications of the published navigation procedure.

6. The method as claimed in claim 1, wherein the modified published navigation procedure is one modification of a plurality of modifications of the published navigation procedure, the method further comprising enabling a programmed selection key on a display console of the FMS for selecting among the plurality of modifications of the published navigation procedure.

* * * * *